United States Patent

Shimizu et al.

[11] Patent Number: 5,934,407
[45] Date of Patent: Aug. 10, 1999

[54] STEERING ASSIST SYSTEM FOR VEHICLES

[75] Inventors: Yasuo Shimizu; Hiroyuki Tokunaga, both of Saitama-ken, Japan

[73] Assignee: Honda Gilken Kogyo Kabushiki Kaisha, Tokyo, Japan

[21] Appl. No.: 08/757,865

[22] Filed: Nov. 27, 1996

[30] Foreign Application Priority Data

Dec. 1, 1995 [JP] Japan .................................. 7-337771

[51] Int. Cl.⁶ .................................................. G06F 19/00
[52] U.S. Cl. .............................................. 180/446; 701/41
[58] Field of Search .................................. 701/25, 26, 41, 701/42; 180/443, 446

[56] References Cited

U.S. PATENT DOCUMENTS

| 4,727,492 | 2/1988 | Reeve et al. | 70/25 |
| 5,485,378 | 1/1996 | Franke et al. | 701/41 |
| 5,552,990 | 9/1996 | Ihara et al. | 701/208 |
| 5,661,650 | 8/1997 | Sekine et al. | 701/41 |
| 5,684,696 | 11/1997 | Rao et al. | 701/25 |

FOREIGN PATENT DOCUMENTS 60-89298  5/1985  Japan .

Primary Examiner—Kevin Hurley
Attorney, Agent, or Firm—Skjerven, Morrill, MacPherson, Franklin & Friel LLP

[57] ABSTRACT

In a power assisted vehicle steering system, an actual traveling direction of the vehicle, and a tangential direction of a road on which the vehicle is traveling are detected, and the actuator for the steering system is controlled so as to reduce or minimize a deviation of the actual traveling direction of the vehicle from the road tangential direction. Thus, a supplemental steering torque is produced so as to force the direction of the vehicle into agreement with the direction of the road so that the effort required for the vehicle operator to maintain the vehicle on the road can be reduced or even eliminated, and the lateral stability of the vehicle is improved both on straight roads and curved roads.

9 Claims, 7 Drawing Sheets

STEERING ASSIST SYSTEM FOR VEHICLES

TECHNICAL FIELD

The present invention relates to a system for assisting a vehicle operator's effort to maintain the vehicle on the road by predicting the tangential direction of the road and producing a suitable steering torque at each instance.

BACKGROUND OF THE INVENTION

Japanese patent laid open publication (kokai) No. 60-89298 discloses a system which predicts the curvature of the road ahead according to map information obtained from a GPS or other navigation aid system, and notifies the vehicle operator if the vehicle can safely go through the curve at the current vehicle speed. However, this system simply issues a warning if the vehicle speed is excessive for the vehicle to safely turn the curve, and is not capable of significantly reducing the effort required for the vehicle operator in turning the curve.

BRIEF SUMMARY OF THE INVENTION

In view of such problems of the prior art, a primary object of the present invention is to provide a steering aid system which can reduce the effort required by the vehicle operator to maintain the vehicle on the road.

A second object of the present invention is to provide a steering aid system which can assist the vehicle operator's effort to maintain the vehicle on the road without depriving the vehicle operator's control over the handling of the vehicle.

A third object of the present invention is to provide a steering aid system which can improve the lateral stability of the vehicle as it travels either a straight or curved road.

According to the present invention, these and other objects can be accomplished by providing a steering assist system for vehicles, comprising: a steering system for steering a vehicle; an actuator for applying a steering torque to the steering system; actual direction detecting means for detecting an actual traveling direction of the vehicle; target direction detecting means for detecting a tangential direction of a road on which the vehicle is traveling; and control means for controlling the actuator so as to produce a controlled steering torque which tends to reduce or minimize a deviation of the actual traveling direction of the vehicle from the road tangential direction.

Thus, a supplemental steering torque is produced so as to force the direction of the vehicle into agreement with the direction of the road so that the effort required for the vehicle operator to maintain the vehicle on the road can be reduced or even eliminated. When the vehicle is traveling a straight road, the vehicle operator can feel an increase in the reaction of the steering wheel when he attempts to turn the steering wheel in either direction so that the tendency of the vehicle to maintain a straight course is increased. When the vehicle is turning a corner, the steering reaction is minimized when the steering angle is suitable for maintaining the vehicle on the road so that not only the stability of the vehicle as it turns the curve can be increased but also the vehicle operator's effort to turn the steering wheel is reduced.

The steering assist system may comprise manual steering input means, and a manual steering torque sensor for detecting a manual steering torque applied to the manual steering means, the control means including means for modifying the controlled steering torque according to a manual steering torque applied to the manual steering means. It is therefore possible to freely select the extent to which the manual effort is required to steer the vehicle. According to a preferred embodiment of the present invention, the modifying means may simply add a value corresponding to the manual steering torque to the controlled steering torque. Therefore, the manual intervention can take over the steering control when the vehicle operator so wishes, and a fully automated steering is also possible if the vehicle operator so wishes. In other words, the vehicle operator can freely select the amount of human intervention according to the magnitude of the applied manual steering input.

The actual direction detecting means may comprise a compass which is adapted to detect a geomagnetic field or a yaw rate sensor so that the direction of the vehicle may be computed by integrating the yaw rate. It is desirable from a practical view point to include means for correcting an output signal from the actual direction detecting means according to an output signal from the target direction detecting means which may comprise map information output means which produces map information of an area including a location of the vehicle, current position detecting means for detecting a current position of the vehicle in the map information, and road direction detecting means for detecting a direction of a road at a point where the vehicle is currently located. The current position detecting means may for instance consist of a GPS.

For stable control of the lateral or steering movement of the vehicle, it is preferable to predict the curvature of the road some distance ahead of the vehicle. It is therefore preferable if the actual direction detecting means and the target direction detecting means both comprise means for predicting a direction of a part of the road which is some distance ahead of the vehicle.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
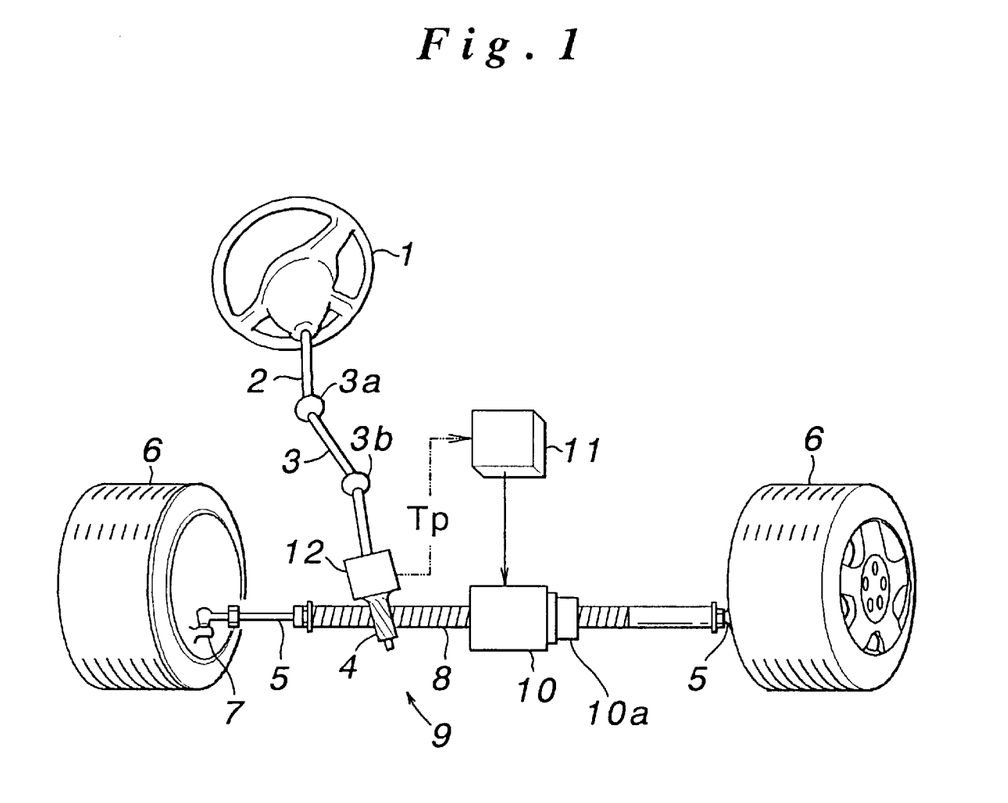
FIG. 1 is a simplified diagram of a vehicle steering system to which the present invention is applied.

FIG. 1 shows the general structure of an electric power steering system to which the present invention is applied. This system comprises a steering wheel 1, a steering shaft 2 which is integrally attached to the steering wheel 1, and a pinion 4 of a rack and pinion mechanism which is connected to the lower end of the steering shaft 2 via a connecting shaft 3 having a pair of universal joints 3a and 3b at its either axial end. The rack and pinion mechanism further comprises a rack 8 which can move laterally in the vehicle body and meshes with the pinion 4. The two ends of the rack 8 are connected to knuckle arms 7 of the right and left front wheels 6 via tie rods 5, respectively. The structure described so far forms manual steering means 9 for transmitting the manual steering torque applied to the steering wheel 1 to the front wheels 6.

This steering system additionally comprises an electric motor 10 which is coaxially disposed with respect to the rack 8, a ball-nut mechanism 10a for converting the rotational torque of the electric motor 10 to the thrust of the rack 8, and a control unit 11 for controlling the output of the electric motor 10. The pinion 4 is connected to a manual steering torque sensor 12 for detecting the manual steering torque applied to the steering wheel 1.

Figure 2:
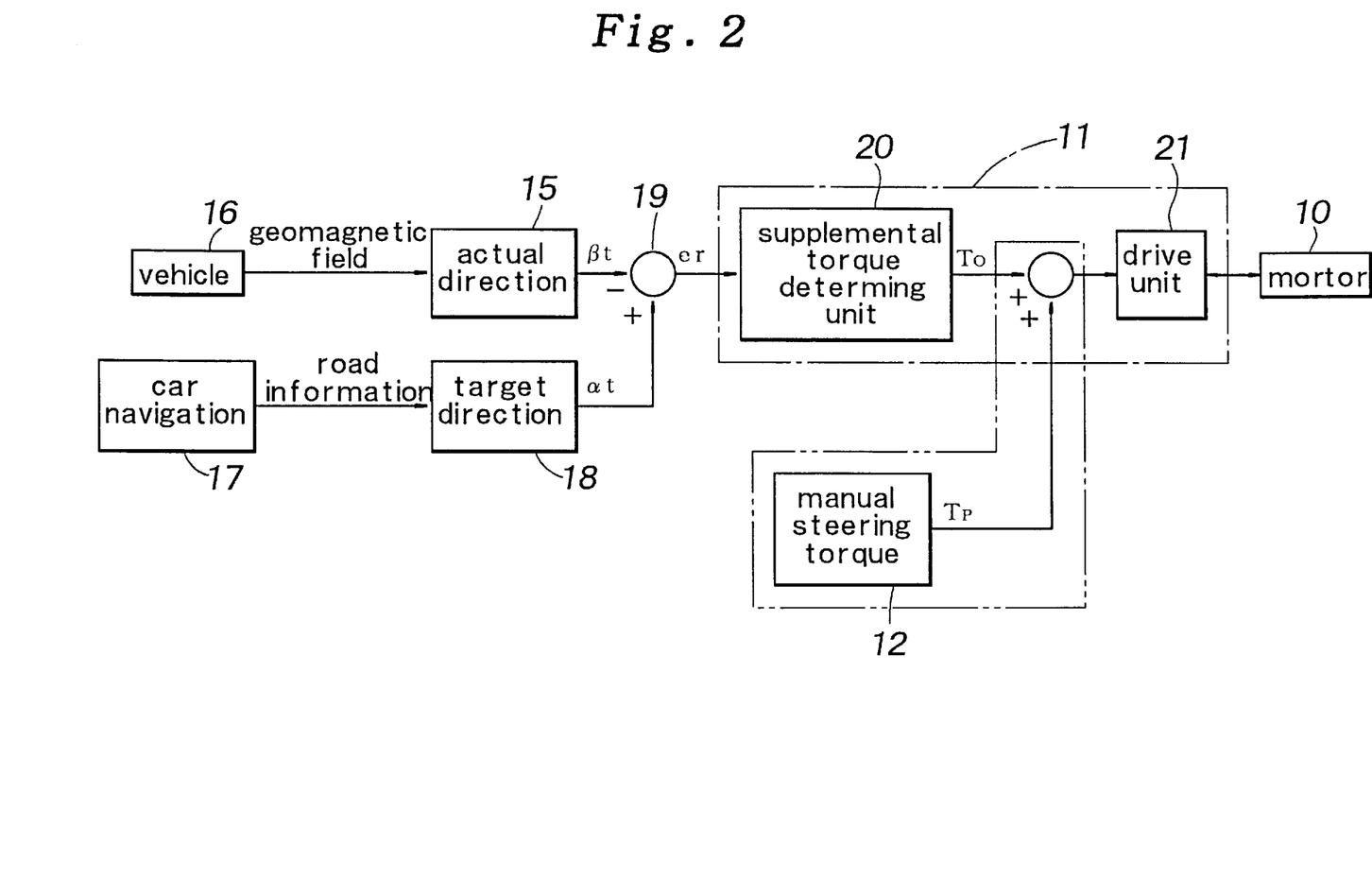
FIG. 2 is a block diagram of a first embodiment of the steering assist system according to the present invention.

FIG. 2 shows the control arrangement for this power steering system. The deviation er of the actual traveling direction $\beta_t$ of the vehicle detected by the actual direction detecting unit 15, such as a compass which is adapted to detect a geomagnetic field, from the tangential direction $\alpha_t$ of the road which is detected by a target direction detecting unit 18 according to map information obtained from a car navigation system 17 as described hereinafter. A supplemental torque $T_0$ which the electric motor 10 should produce in order to reduce this deviation er is computed by a supplemental torque determining unit 20, and a motor drive unit 21 supplies a suitable command to the electric motor 10 according to the computed supplemental torque $T_0$.

This mode of electric motor control can produce all of the torque required to steer the vehicle. In this case, it is possible to steer the vehicle according to the curvature of the road without any intervention by the vehicle operator. By detecting the manual steering torque $T_p$ applied to the pinion 4 with the manual steering torque sensor 12, whenever the magnitude of the manual steering torque $T_p$ exceeds a certain threshold value, the output of the electric motor 10 may be adjusted so that the effort required to manually steer the vehicle may be reduced. The latter mentioned function may be achieved by the part of FIG. 2 surrounded by the two-dot chain line. In this case, a certain amount of intervention of the vehicle operator is necessary to steer the vehicle.

Figure 3:
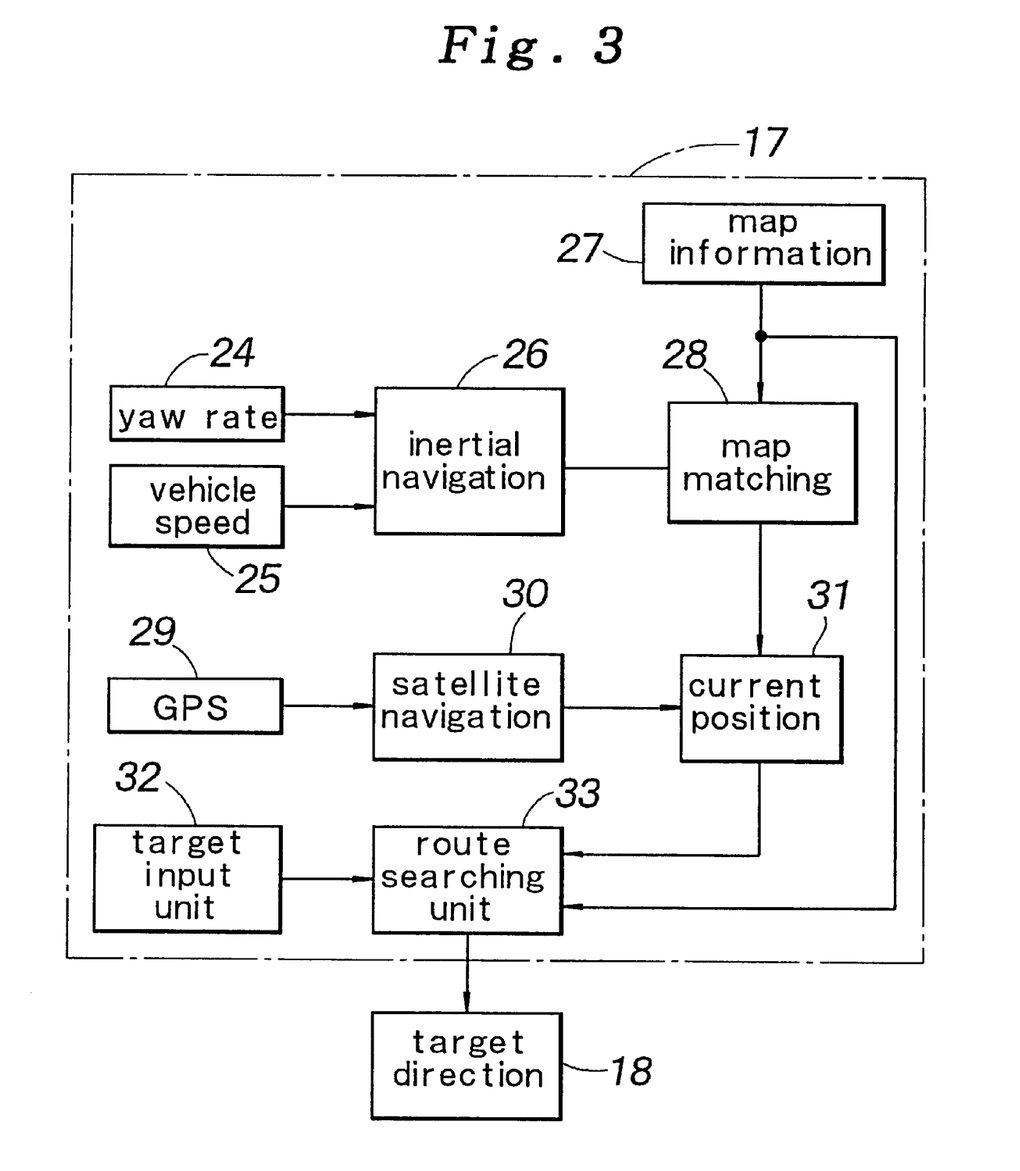
FIG. 3 is a block diagram of the car navigation system.

FIG. 3 shows the structure of the car navigation system 17 for obtaining the target direction. This system comprises an inertial navigation system 26 which determines the trajectory of the vehicle according to the signals from a yaw rate sensor 24 and a vehicle speed sensor 25, a map information output unit 27 which may include a CD-ROM containing map information, a map matching unit which compares the actual trajectory in the vehicle with the map information, a satellite navigation system 30 which determines the global position of the vehicle according to a signal from a GPS antenna 29, a position determining unit 31 which determines the position of the vehicle on the map according to the positional coordinate produced from the map matching unit 28 and the positional coordinate produced from the satellite navigation system 30, and a route searching unit 33 for searching the route from the current position of the vehicle determined by the position determining unit 31 to the target position defined by a target input unit 32.

The route searched by the route searching unit 33 consists of a number of points. The location of the vehicle t seconds later from the current time point can be predicted by knowing the current position, and integrating the traveling speed of the vehicle. Therefore, according to the map information of the road on which the vehicle is traveling, the target direction detecting unit 18 can predict the tangential direction of each point on the predicted path of travel of the vehicle. How far ahead of the vehicle the tangential direction should be predicted may be selected according to the traveling speed of the vehicle and the computing capability of the control system.

Figure 4:
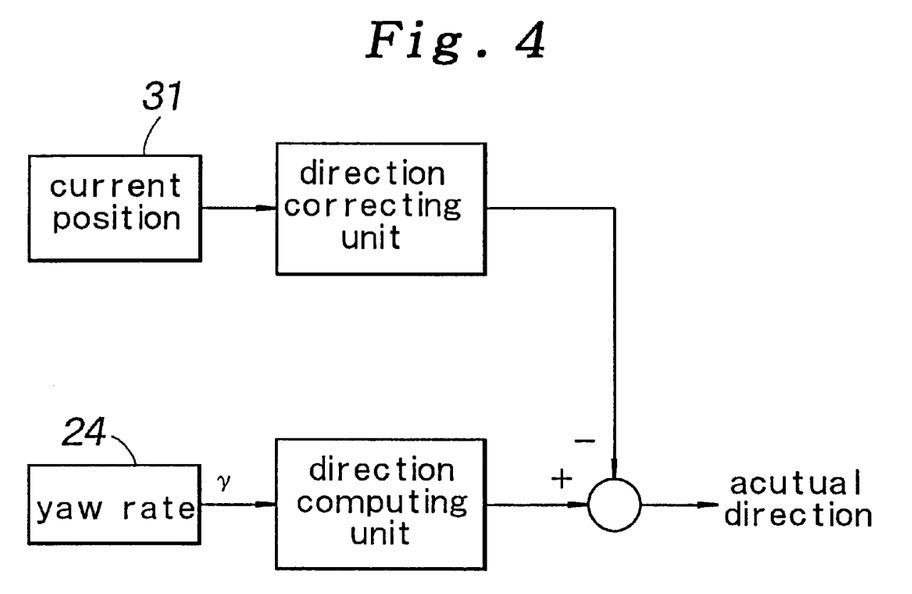
FIG. 4 is a block diagram of the actual direction detecting unit.

The actual direction of the vehicle can be determined on a real time basis not only with the compass but also from the current yaw rate $\gamma$ according to the following formula.

$$\beta_t = \beta_0 - \gamma \cdot t$$

where $\beta_0$ is the current direction of the vehicle, and $\beta_t$ is the predicted direction of the vehicle t seconds later from the current position. FIG. 4 illustrates this procedure. In this case, the vehicle slip angle may be disregarded as it is normally sufficiently small. If required, the detecting accuracy of the actual direction of the vehicle can be improved by correcting the value at an appropriate timing according to the information on the current position of the vehicle obtained by the vehicle position detecting unit 31 which for instance may consist of a GPS combined with map information.

If it is assumed that the direction of the tangential line of the point of the path which the vehicle reaches in t seconds is $\alpha_t$, and the predicted direction of the vehicle t seconds later from the current position is $\beta_t$, then, the directional deviation at the current position will be er=$\alpha_t-\beta_t$. Thus, the vehicle can follow the path if the electric motor 10 produces steering torque so as to minimize the directional deviation er.

Figure 5:
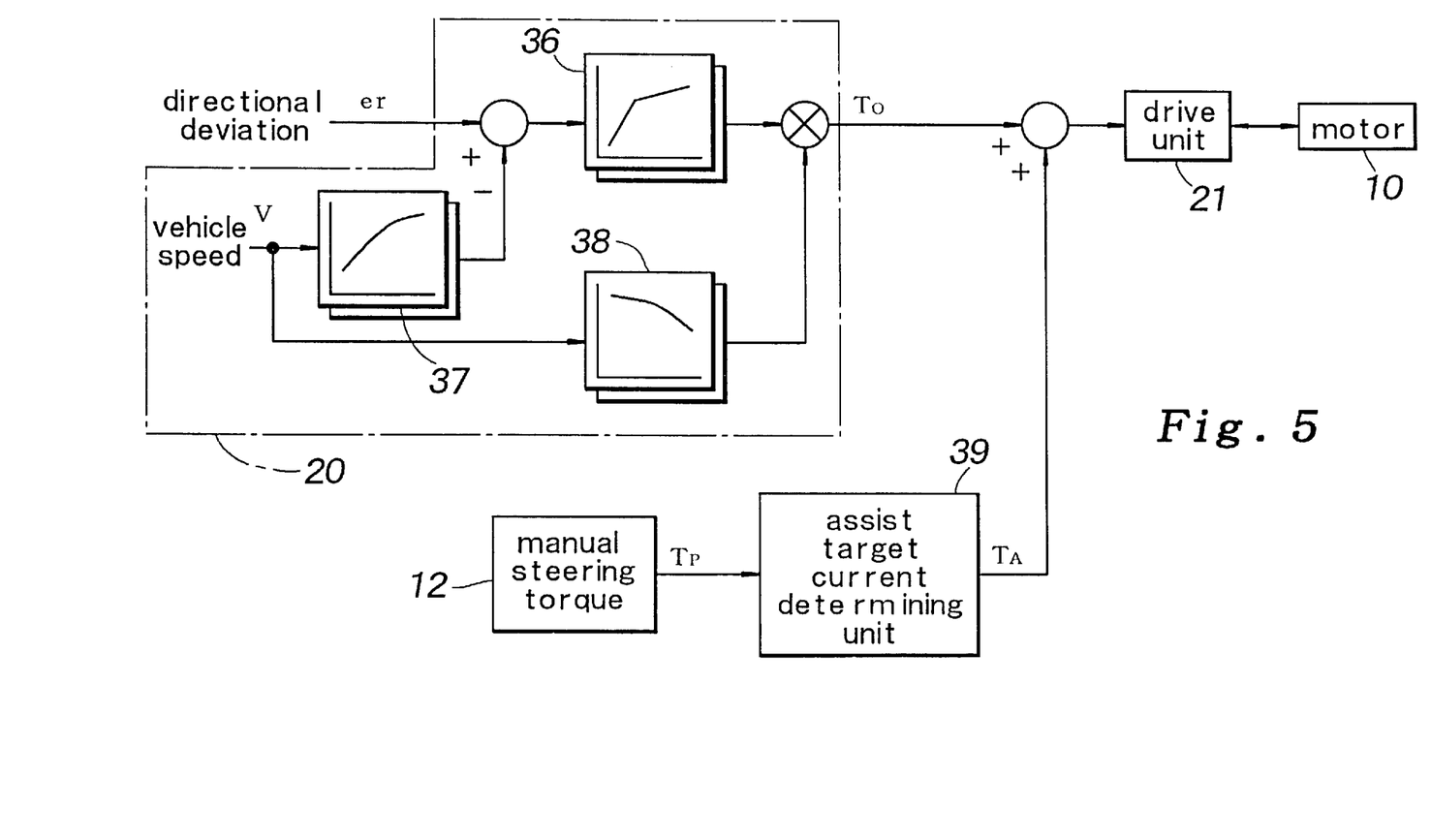
FIG. 5 is a block diagram of a second embodiment of the steering assist system according to the present invention.

The above description was directed to an automatic steering control mode. FIG. 5 shows a second embodiment which is directed to a pure steering assist control mode which provides an assistance to the vehicle operator in his effort to steer the vehicle according to the road information.

Referring to FIG. 5, the supplemental torque determining unit 20 comprises a reactive torque base map 36 which provides basic information for determining a reactive torque appropriate for each directional deviation er, a vehicle speed offset map 37 which changes the width of the insensitive range of the directional deviation defined on either side of zero directional deviation according to the vehicle speed, and a vehicle speed ratio map 38 which changes the gain in determining the reactive torque $T_0$ according to the vehicle speed V.

First of all, the minimum level of the directional deviation from which the reactive torque control begins is determined by subtracting a value looked up from the vehicle speed offset map 37 from the predicted directional deviation er. As a result, small changes in the actual direction of the vehicle are disregarded so that a stable control action becomes possible. According to this embodiment, the value of the vehicle speed offset map 37 is progressively increased with the vehicle speed so that the stability of the system against noises in a high speed range can be increased. The base torque for the supplemental reaction is determined for each given corrected directional deviation according to the reactive torque base map 36.

By changing the control gain in dependence on the vehicle speed V according to the vehicle speed ratio map 38, the final value of the supplemental torque command is determined. Thus, as the vehicle speed increases, the steering torque applied to the front wheels is diminished so that the front wheels would not be excessively steered. According to this embodiment, the supplemental steering torque is added to the normal assist torque $T_A$ of the power steering system determined by the assist target current determining unit 39 according to the manual steering torque value, and the electric motor is therefore controlled so that an optimum assist torque is produced for each current curvature of the road.

Figure 6:
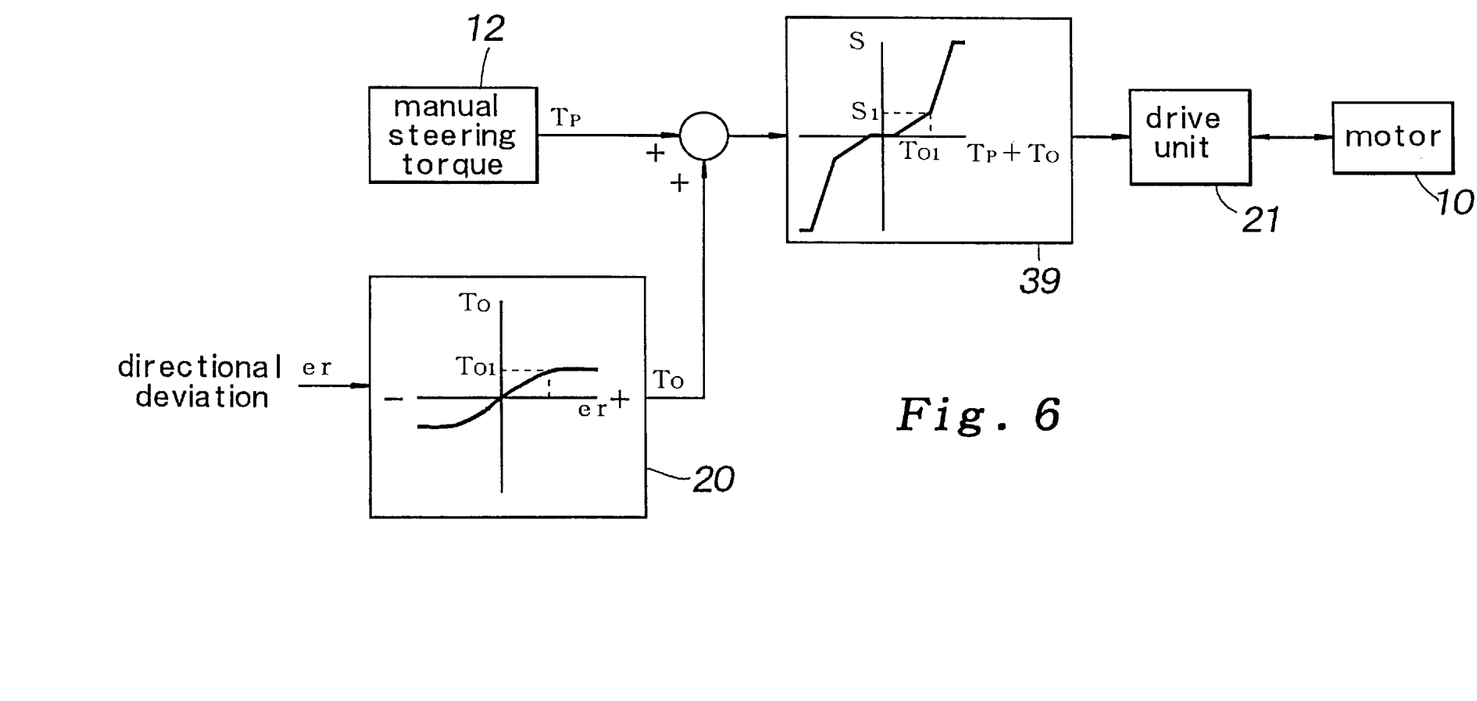
FIG. 6 is a block diagram of a third embodiment of the steering assist system according to the present invention.

FIG. 6 shows a third embodiment of the present invention. In this embodiment, the supplemental torque determining unit 20 produces a signal $T_0=f(er)$ which is to be added to the value $T_p$ detected by the manual steering torque sensor 12 for each given direction deviation er. This signal is determined as described in the following with reference to FIG. 7.

Figure 7:
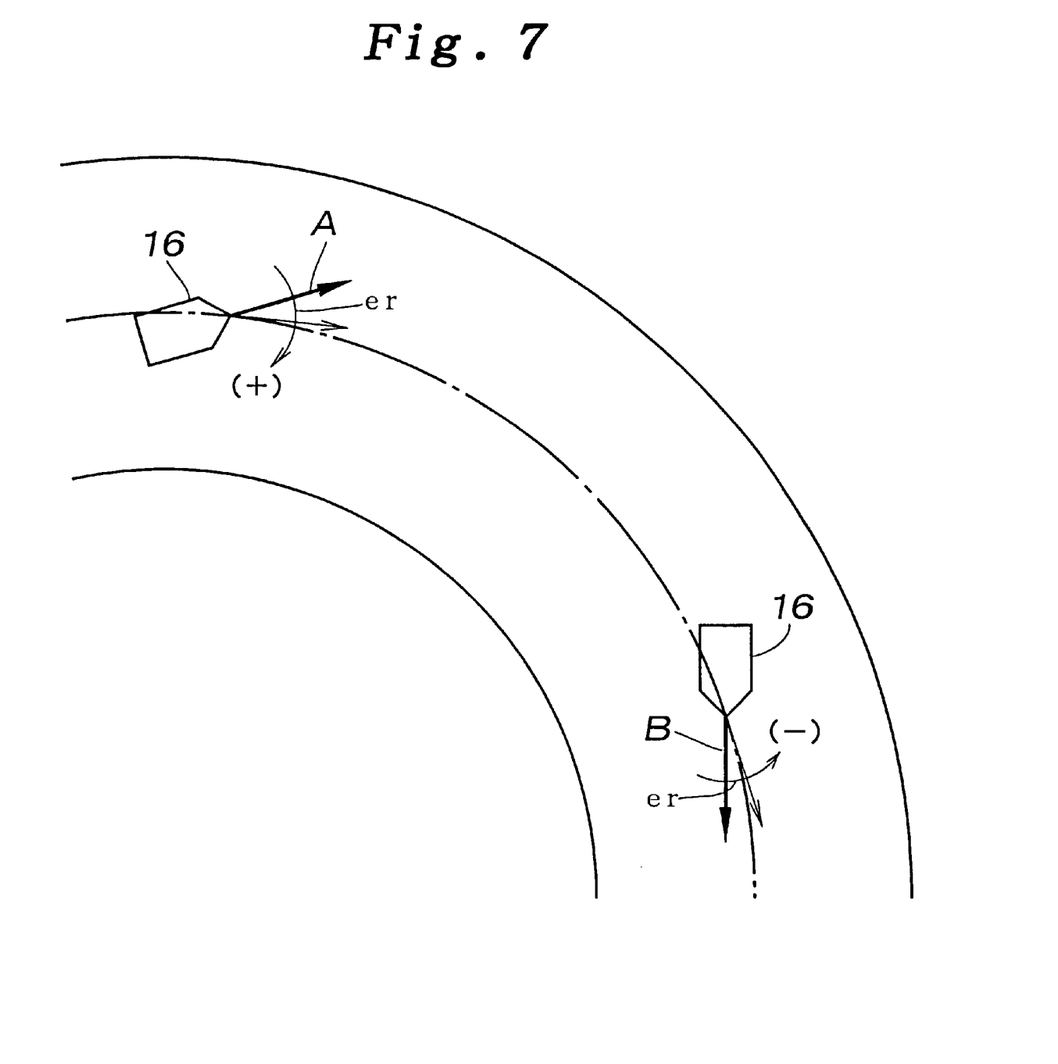
FIG. 7 is a diagram for illustrating the process of determining a supplemental torque for each given directional deviation.

When the vehicle 16 is directed in direction A in FIG. 7, because the directional deviation er is a certain positive angle, a supplemental torque signal corresponding to the directional deviation is produced even in absence of any manual steering torque signal. As a result, the assist target current determining unit 39 produces an electric motor drive signal, and the electric motor 10 is driven by the drive unit 21 in such a manner that the steering wheel 1 is turned clockwise, and the direction of the vehicle is brought into agreement with the target direction.

Conversely, when the vehicle 16 is directed in direction B in FIG. 7, because the directional deviation er is a certain negative angle, the steering wheel 1 is turned counterclockwise, and the direction of the vehicle is again brought into agreement with the target direction. An upper limit may be provided in the supplemental torque signal produced from the supplemental torque determining unit 20 so that the vehicle operator is required to cooperate with the system when turning relatively sharp corners.

Thus, according to the present invention, a supplemental steering torque is produced so as to force the direction of the vehicle into agreement with the direction of the road so that the effort required for the vehicle operator to maintain the vehicle on the road can be reduced. When the vehicle is traveling a straight road, the vehicle operator can feel an increase in the reaction of the steering wheel when he attempts to turn the steering wheel in either direction so that the tendency of the vehicle to maintain a straight course is increased. When the vehicle is turning a corner, the steering reaction is minimized when the steering angle is suitable for maintaining the vehicle on the road so that not only the stability of the vehicle as it turns the curve can be increased but also the vehicle operator's effort to turn the steering wheel is reduced.

Although the present invention has been described in terms of preferred embodiments thereof, it is obvious to a person skilled in the art that various alterations and modifications are possible without departing from the scope of the present invention which is set forth in the appended claims.

What we claim is:

1. A steering assist system for vehicles, comprising:
    a steering system for steering a vehicle;
    an actuator for applying a steering torque to said steering system;
    actual direction detecting means for detecting an actual traveling direction of said vehicle;
    target direction detecting means for detecting a tangential direction of a road on which said vehicle is traveling; and
    control means for controlling said actuator so as to produce a controlled steering torque which tends to reduce a deviation of said actual traveling direction of said vehicle from said road tangential direction.

2. A steering assist system for vehicles according to claim 1, further comprising manual steering input means, and a manual steering torque sensor for detecting a manual steering torque applied to said manual steering means, said control means including means for modifying said controlled steering torque according to a manual steering torque applied to said manual steering means.

3. A steering assist system for vehicles according to claim 2, wherein said modifying means adds a value corresponding to said manual steering torque to said controlled steering torque.

4. A steering assist system for vehicles according to claim 1, wherein said actual direction detecting means comprises a compass which is adapted to detect a geomagnetic field.

5. A steering assist system for vehicles according to claim 1, wherein said actual direction detecting means comprises a yaw rate sensor.

6. A steering assist system for vehicles according to claim 1, further comprising means for correcting an output signal from said actual direction detecting means according to an output signal from said target direction detecting means.

7. A steering assist system for vehicles according to claim 1, wherein said target direction detecting means comprises map information output means which produces map information of an area including a location of said vehicle, current position detecting means for detecting a current position of said vehicle in said map information, and road direction detecting means for detecting a direction of a road at a point where said vehicle is currently located.

8. A steering assist system for vehicles according to claim 1, wherein said actual direction detecting means and said target direction detecting means both comprise means for predicting a direction of a part of the road which is some distance ahead of said vehicle.

9. A steering assist system for vehicles, comprising:
    a steering system for steering a vehicle;
    an actuator for applying a steering torque to said steering system;
    actual direction detecting means for detecting an actual traveling direction of said vehicle;
    target direction detecting means for detecting a tangential direction of a road on which said vehicle is traveling; and
    control means for controlling said actuator so as to produce a controlled steering torque which tends to minimize a deviation of said actual traveling direction of said vehicle from said road tangential direction.

* * * * *